US008913062B2

(12) United States Patent
Miyashita et al.

(10) Patent No.: US 8,913,062 B2
(45) Date of Patent: Dec. 16, 2014

(54) DISPLAY DEVICE AND NON-TRANSITORY COMPUTER-READABLE MEDIUM STORING DISPLAY CONTROL PROGRAM

(71) Applicants: Tomoki Miyashita, Nagoya (JP); Hidekazu Ishii, Nagoya (JP); Nako Yoshimura, Nagoya (JP)

(72) Inventors: Tomoki Miyashita, Nagoya (JP); Hidekazu Ishii, Nagoya (JP); Nako Yoshimura, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 270 days.

(21) Appl. No.: 13/625,067

(22) Filed: Sep. 24, 2012

(65) Prior Publication Data
US 2013/0120397 A1    May 16, 2013

(30) Foreign Application Priority Data
Nov. 15, 2011    (JP) .................................. 2011-249319

(51) Int. Cl.
| G06T 11/00 | (2006.01) |
| G06F 3/0484 | (2013.01) |
| G06F 3/14 | (2006.01) |
| G09G 5/26 | (2006.01) |

(52) U.S. Cl.
CPC ................ G06F 3/0484 (2013.01); G06F 3/14 (2013.01); G09G 5/26 (2013.01); G09G 2340/145 (2013.01)

USPC .......................................................... 345/472

(58) Field of Classification Search
None
See application file for complete search history.

(56) References Cited

U.S. PATENT DOCUMENTS

| 2007/0113206 A1* | 5/2007 | Suzuki et al. .................. 715/858 |
| 2007/0260981 A1* | 11/2007 | Kim et al. ...................... 715/531 |
| 2014/0101543 A1* | 4/2014 | Curin et al. .................... 715/271 |

FOREIGN PATENT DOCUMENTS

| JP | H06-266704 A | 9/1994 |
| JP | H11-184594 A | 7/1999 |

* cited by examiner

*Primary Examiner* — Phi Hoang
*Assistant Examiner* — Mohammad H Akhavannik
(74) *Attorney, Agent, or Firm* — McCarter & English, LLP

(57) ABSTRACT

A display device includes an operation portion, a display portion, a character designating portion, and a display control portion. The display control portion displays the at least one character on the display portion. The display control portion displays, in a case where the at least one character displayed on the display portion includes a predetermined special character and the number of at least one display lines is not less than a threshold value, a dot pattern for an alternate character instead of a dot pattern for the special character. The display control portion changes, in a case where a designated character is the alternate character, the dot pattern for the designated character displayed on the display portion to the dot pattern for the special character.

20 Claims, 16 Drawing Sheets

DISPLAY DEVICE AND NON-TRANSITORY COMPUTER-READABLE MEDIUM STORING DISPLAY CONTROL PROGRAM

CROSS-REFERENCE TO RELATED APPLICATION

This application claims priority to Japanese Patent Application No. 2011-249319, filed Nov. 15, 2011, the disclosure of which is incorporated herein by reference in its entirety.

BACKGROUND

The present disclosure relates to a display device that is capable of displaying characters (text characters, numerals, symbols, graphics, and the like), and to a non-transitory computer-readable medium that stores a display control program that displays characters.

Display devices are known that can improve the visual comprehensibility of characters (text characters, numerals, symbols, graphics, and the like) that a user designates. For example, a display device is known that, when a cursor is positioned over a character string that has been one of enlarged and reduced to a desired size, displays a print layout image of an entire page in a separate window. A display device is also known that displays, in one of enlarged and reduced form in the same window, a portion of a display area that the user has designated.

SUMMARY

In a case where the screen size and the resolution of the display device are small, there may be significant restrictions on an enlarged display of the characters that the user has designated. For example, in a case where an enlarged display is implemented in a separate window, it may be difficult for the display device to set aside a display area for the separate window. In a case where the separate window is displayed, other characters may be concealed behind the separate window, creating the possibility that the visual comprehensibility of the entire screen will be impaired.

In a case where an enlarged display is implemented in the same window, a blank area for enlarging the characters may be required. In a case where a blank area is not available, the display device may need to either display the enlarged characters such that they overlap other characters or erase the other characters from the screen, creating the possibility that the visual comprehensibility of the entire screen will be impaired.

Various exemplary embodiments of the general principles herein provide a display device, as well as a non-transitory computer-readable medium that stores a display control program, that can improve the visual comprehensibility of the characters that the user designates, while limiting impairment of the visual comprehensibility of the entire screen.

The exemplary embodiments described herein provide a display device that includes an operation portion, a display portion, a character designating portion, and a display control portion. The operation portion is for inputting and editing at least one character. The display portion is capable of displaying, in a form of a dot pattern, the at least one character that has been at least one of input and edited from the operation portion, the at least one character being disposed in at least one display line, each of the at least one display line being configured as one of a vertical line and a horizontal line. The character designating portion is for designating, as a designated character, one of the at least one character displayed on the display portion. The display control portion displays the at least one character on the display portion using a dot pattern with a display size, the display size being determined in advance in accordance with a number of the at least one display line. The display control portion displays, in a case where the at least one character displayed on the display portion includes a predetermined special character and the number of the at least one display lines is not less than a threshold value, a dot pattern for an alternate character instead of a dot pattern for the special character, the alternate character being different from the special character. The display control portion changes, in a case where the designated character is the alternate character, the dot pattern for the designated character displayed on the display portion to the dot pattern for the special character with a display size that is used in a case where the number of the at least one display line is less than the threshold value.

The exemplary embodiments described herein also provide a display device that includes an operation portion, a display portion, a character designating portion, and a processor. The operation portion is configured to input and edit at least one character. The display portion is configured to display, in a form of a dot pattern, the at least one character that has been at least one of input and edited from the operation portion, the at least one character being disposed in at least one display line, each of the at least one display line being configured as one of a vertical line and a horizontal line. The character designating portion is configured to designate, as a designated character, one of the at least one character displayed on the display portion. The processor is configured to cause the display device to display the at least one character on the display portion using a dot pattern with a display size, the display size being determined in advance in accordance with a number of the at least one display line. The processor is configured to cause the display device to display, in a case where the at least one character displayed on the display portion includes a predetermined special character and the number of the at least one display lines is not less than a threshold value, a dot pattern for an alternate character instead of a dot pattern for the special character, the alternate character being different from the special character. The processor is configured to cause the display device to change, in a case where the designated character is the alternate character, the dot pattern for the designated character displayed on the display portion to the dot pattern for the special character with a display size that is used in a case where the number of the at least one display line is less than the threshold value.

The exemplary embodiments described herein also provide a non-transitory computer readable medium storing a display control program. The display control program contains instructions for a computer of a display device. The display device is provided with an operation portion for inputting and editing at least one character, a display portion that is capable of displaying, in a form of a dot pattern, the at least one character that has been at least one of input and edited from the operation portion, the at least one character being disposed in at least one display line, each of the at least one display line being configured as one of a vertical line and a horizontal line, and a character designating portion for designating, as a designated character, one of the at least one character displayed on the display portion. The instructions in the display control program causing the computer to perform the steps of: displaying the at least one character on the display portion using a dot pattern with a display size, the display size being determined in advance in accordance with a number of the at least one display line, displaying, in a case where the at least one character displayed on the display portion includes a predetermined special character and the number of the at least one display lines is not less than a threshold value, a dot pattern for an alternate character instead of a dot pattern for the special character, the alternate character being different from the special character, and changing, in a case where the designated character is the alternate character, the dot pattern for the designated character displayed on the display portion to the dot pattern for the special character with a display size that is used in a case where the number of the at least one display line is less than the threshold value.

BRIEF DESCRIPTION OF THE DRAWINGS

Exemplary embodiments of the present disclosure will be described below in detail with reference to the accompanying drawings in which.

DETAILED DESCRIPTION

A first embodiment of the present disclosure will be explained with reference to the drawings. The overall configuration of a printer 1 will be explained with reference to FIGS. 1 and 2. In the explanation that follows, the upper right, the lower left, the lower right, the upper left, the top, and the bottom in FIGS. 1 and 2 respectively correspond to the rear, the front, the right, the left, the top, and the bottom of the printer 1.

Figure 1:
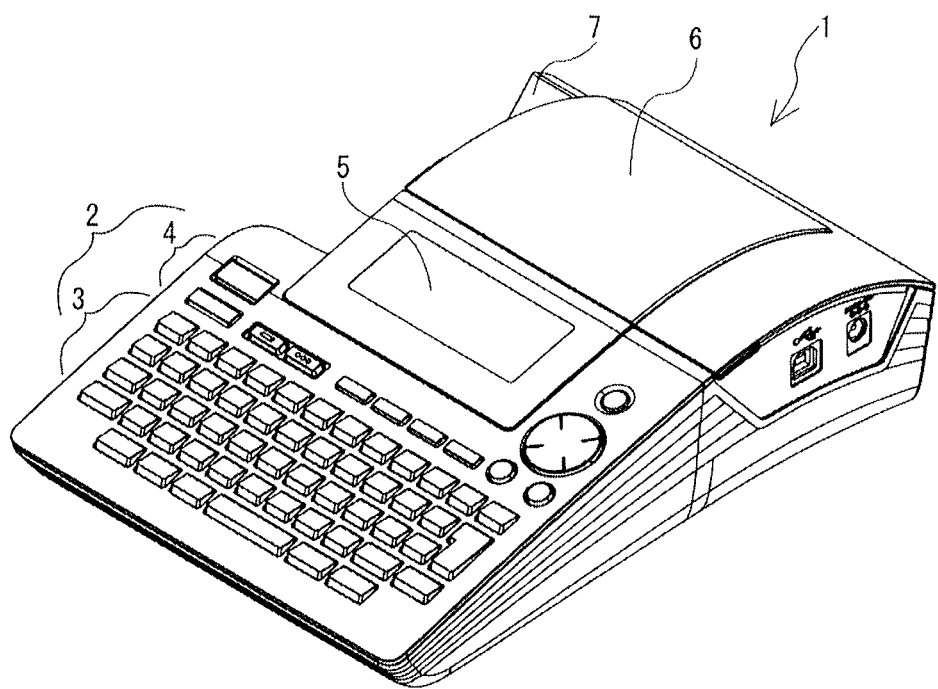
FIG. 1 is an oblique view of a printer 1 on which a cover 6 is closed.

As shown in FIG. 1, a keyboard 3 for inputting characters (text characters, pictorial symbol characters, numerals, and the like) is provided on the top face of the printer 1. A function key cluster 4 that includes a power switch, utility keys, a cursor key, and the like is provided to the rear (in FIG. 1, to the upper right) of the keyboard 3. The utility keys include a print key, a text character key, a set key, an escape key, a delete all key, a cancel key, and the like. A display 5 is provided to the rear of the function key cluster 4. A cover 6 that can be opened and closed is provided in the rear portion of the top face of the printer 1. A tape tray 7 that receives a printed tape that has been cut by a cutting mechanism (not shown in the drawings) that will be described later is provided at the left rear corner of the printer 1. In the explanation that follows, the keyboard 3 and the function key cluster 4 are collectively termed an operation portion 2.

The display 5 in the present embodiment is configured to display, in the form of dot patterns, characters that have been input or edited from the operation portion 2, disposing the characters in display lines that extend horizontally (that is, in rows). As one example, the display 5 may be a horizontally rectangular dot matrix LCD that is configured from 128 dots horizontally and 48 dots vertically. The display 5 includes a display area 100 (refer to FIG. 9) of a fixed size (for example, 108 dots horizontally by 36 dots vertically) that is capable of displaying two rows of eight characters each.

The row in which the characters in the display area 100 are displayed in the order in which they are input and are arrayed in the horizontal direction (that is, the direction of a row) is called a display line. In the display area 100 (refer to FIG. 9), a one-line display that displays the characters in one display line (that is, in one row) and a two-line display that displays the characters in two display lines (that is, in two rows) can be implemented. The display size (24 dots vertically) for the individual characters when the one display line (that is, the one row) is formed in the display area 100 is called the one-line size. The display size (12 dots vertically) for the individual characters when the two display lines (that is, the two rows) are formed in the display area 100 is called the two-line size.

Figure 2:
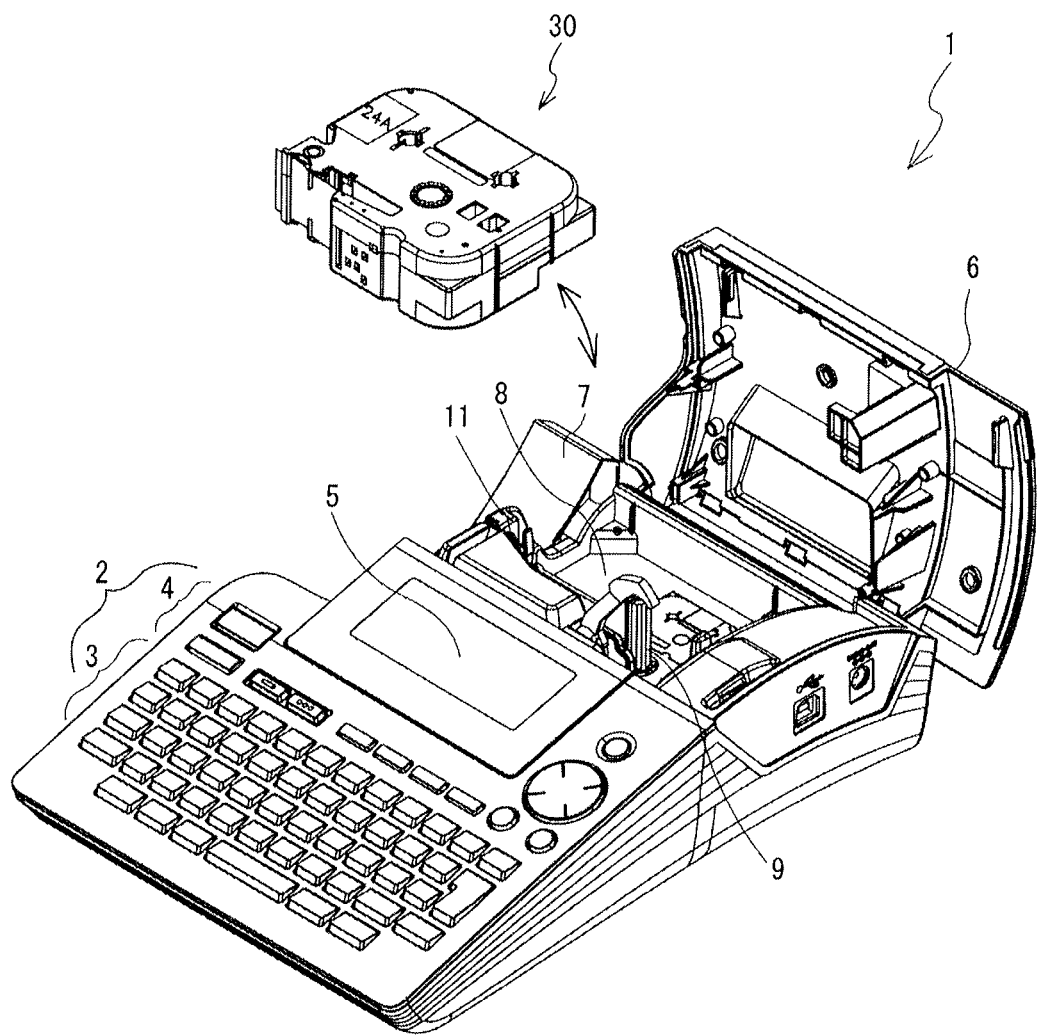
FIG. 2 is an oblique view of the printer 1 on which the cover 6 is open.

As shown in FIG. 2, a cassette mounting portion 8, in which a tape cassette 30 is removably mounted, is formed to the rear of the display 5. The tape cassette 30 in the present embodiment contains, in the interior of a cassette case that is an approximately cuboid (box-shaped) housing, a tape on which text and the like are printed, an ink ribbon that is used for printing on the tape, and the like. Characters that have been input or edited from the operation portion 2 are printed by the printer 1 using the tape cassette 30 that has been mounted in the cassette mounting portion 8.

A tape drive shaft 11 for transporting the tape, a ribbon winding shaft 9 for winding up the used ink ribbon, a thermal head 10 (refer to FIG. 3) that prints the characters, and the like are provided in the cassette mounting portion 8. In the present embodiment, the thermal head 10 performs the printing on the transported tape using the ink ribbon that has not yet been used. The cutting mechanism (not shown in the drawings) that cuts the printed tape is provided on the side of the thermal head 10 that is downstream in the direction that the tape is transported.

Figure 3:
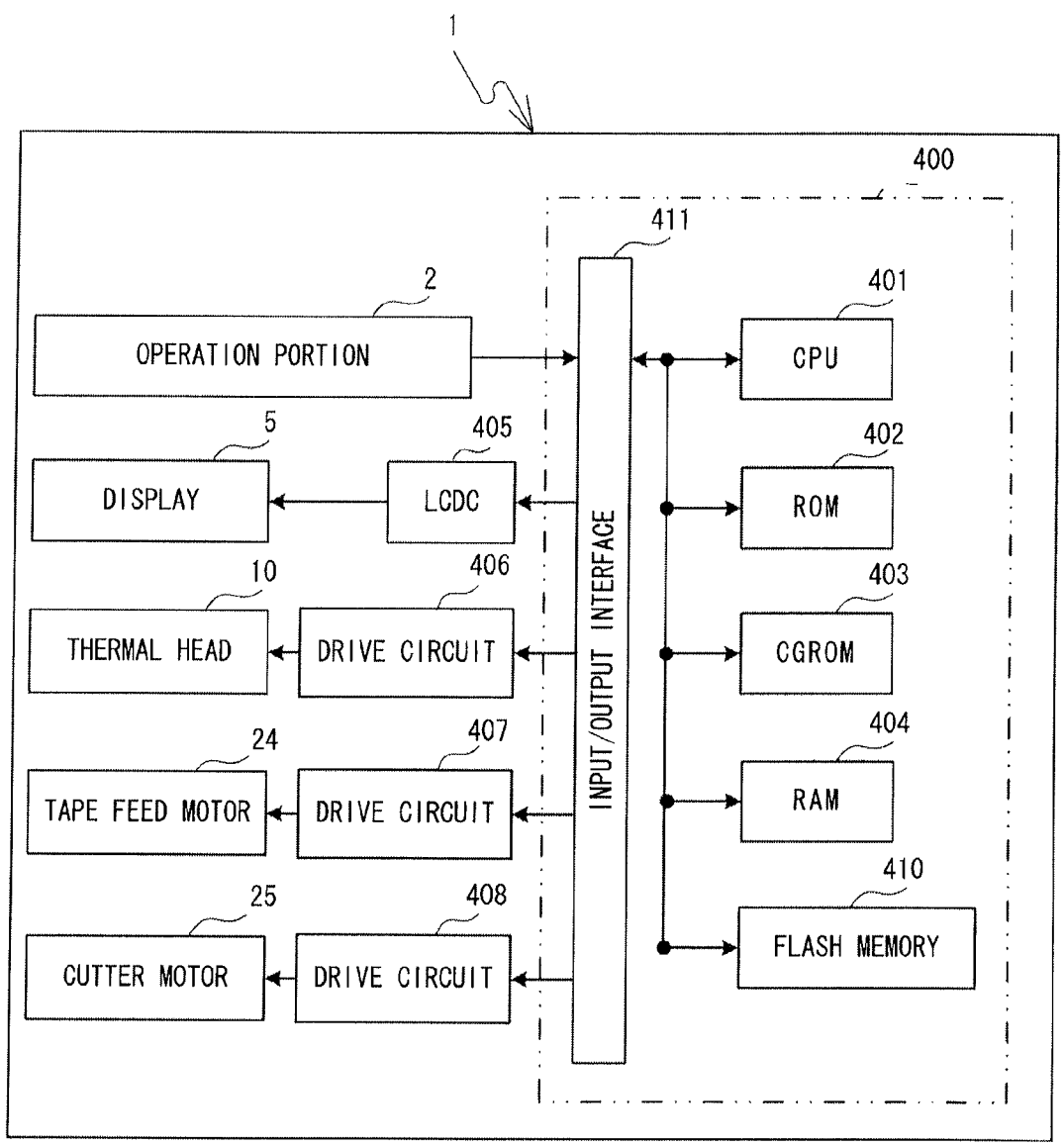
FIG. 3 is a block diagram that shows an electrical configuration of the printer 1.

An electrical configuration of the printer 1 will be explained with reference to FIG. 3. As shown in FIG. 3, the printer 1 is provided with a control circuit portion 400 that is formed on a control board. The control circuit portion 400 is provided with a CPU 401, a ROM 402, a CGROM 403, a RAM 404, a flash memory 410, an input/output interface 411, and the like, all of which are connected through a data bus. The ROM 402 stores various types of programs that the CPU 401 executes in order to control the printer 1. Printing dot patterns for printing characters are stored in the CGROM 403. A plurality of storage areas for a text memory, a print buffer, and the like are provided in the RAM 404.

A work area in which character data may be stored is provided in the RAM 404. The character data describe the characters that have been input or edited from the operation portion 2 (that is, the characters that are displayed in the display area 100). In the present embodiment, in normal display processing (Step S33) and restored display processing (Step S37), which will be described later, a character string (that is, a text) is displayed in the display area 100, based on the character data that are stored in the work area of the RAM 404, by displaying each of the characters along the display line.

The operation portion 2, a liquid crystal drive circuit (LCDC) 405, drive circuits 406, 407, 408, and the like are connected to the input/output interface 411. The LCDC 405 includes a video RAM (not shown in the drawings) for outputting display data (dot patterns) to the display 5. The drive circuit 406 is an electronic circuit for operating the thermal head 10. The drive circuit 407 is an electronic circuit for operating a tape feed motor 24 that turns the ribbon winding shaft 9 and the tape drive shaft 11. The drive circuit 408 is an electronic circuit for operating a cutter motor 25 that operates the cutter mechanism (not shown in the drawings).

Display control processing for the printer 1 will be explained with reference to FIGS. 4 to 8. The display control processing (refer to FIG. 4) is performed by the CPU 401, in accordance with instructions included in a program stored in the ROM 402, when the power supply to the printer 1 is turned on.

Figure 4:
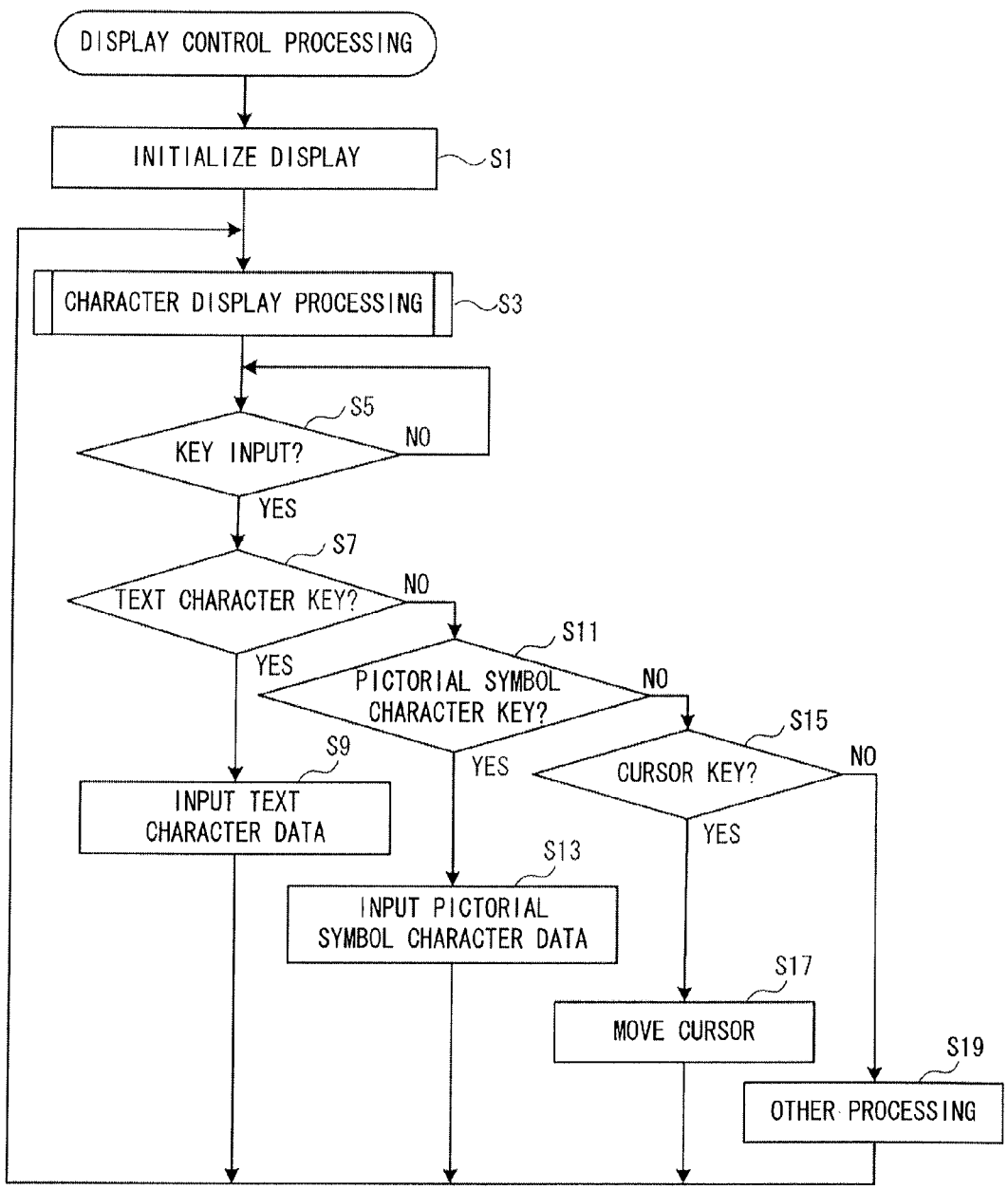
FIG. 4 is a flowchart of display control processing.

As shown in FIG. 4, in the display control processing for the printer 1, first, display initialization of the display 5 is performed (Step S1). An initial screen on which, for example, nothing has been displayed in the display area 100 is thus displayed on the display 5. Next, character display processing is performed (Step S3). In the character display processing, the characters that have been input or edited from the operation portion 2 are displayed on the display 5, but this will be described in detail later. After Step S3 is performed, a determination is made as to whether or not a key input has been made on the operation portion 2 (Step S5). In a case where a key input has not been made (NO at Step S5), the processing returns to Step S5, and the printer 1 enters a state in which it waits for the key input.

In a case where a key input has been made (YES at Step S5), a determination is made as to whether or not a text character key input has been made (Step S7). In the present embodiment, a text character key is a key for inputting a text character 101 (refer to FIG. 9) that is a character such as a katakana character, a hiragana character, a kanji character, a numeral, an alphabetic character, or the like that can be used in a standard text. In a case where a text character key input has been made (YES at Step S7), text character data that describe the text character 101 that has been input are stored in the work area of the RAM 404 (Step S9).

In a case where a text character key input has not been made (NO at Step S7), a determination is made as to whether or not a pictorial symbol character key input has been made (Step S11). In the present embodiment, a pictorial symbol character key is a key for inputting a pictorial symbol character 102 (refer to FIG. 9) that is a character such as a special graphic character, a pictorial symbol character, or the like that cannot be used in a standard text. In a case where a pictorial symbol character key input has been made (YES at Step S11), pictorial symbol character data that describe the pictorial symbol character 102 that has been input are stored in the work area of the RAM 404 (Step S13).

In a case where a pictorial symbol character key input has not been made (NO at Step S11), a determination is made as to whether or not a cursor key input has been made (Step S15). The cursor key is a key for moving a cursor 120 (refer to FIG. 9) along the display line, which will be described later. The cursor 120 indicates an operating position where the input or the editing of a character will be performed. In a case where a cursor key input has been made (YES at Step S15), the display position of the cursor 120 (hereinafter referred to as the cursor position) is moved along the display line in the display area 100 (Step S17).

In a case where a cursor key input has not been made (NO at Step S15), other processing is performed in accordance with the key with which the input has been made. In a case where an input has been made with a return key, for example, line break data that indicate a line break 130 (refer to FIG. 9) are stored in the work area of the RAM 404 in accordance with the operating position within the display area 100 (that is, the display position of the cursor 120). In a case where a character has been deleted, the corresponding character data (the text character data, the pictorial symbol character data, or the like) are deleted from the work area of the RAM 404. The character data in the work area of the RAM 404 are thus edited in accordance with key inputs by the user. After the processing at one of Steps S9, S13, S17, and S19 is performed, the processing returns to Step S3.

Figure 5:
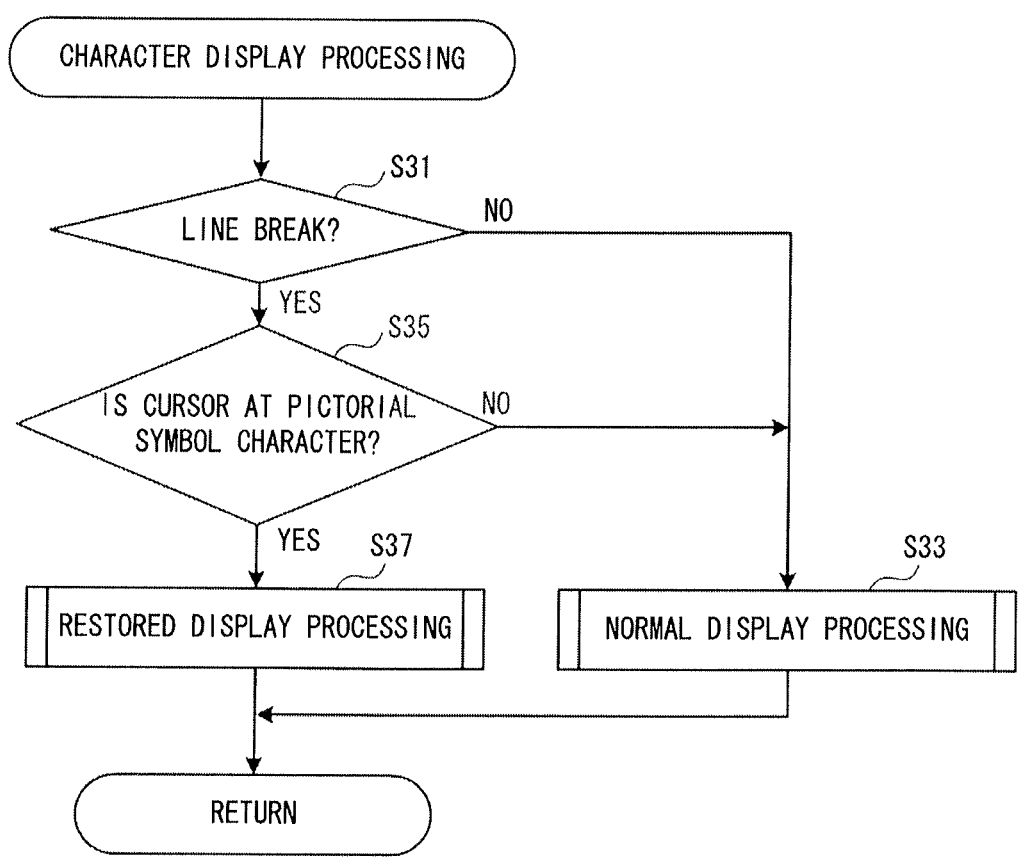
FIG. 5 is a flowchart of character display processing.

In the character display processing (Step S3), first, a determination is made as to whether or not a line break has been input (Step S31), as shown in FIG. 5. In a case where there are no line break data in the work area of the RAM 404, the determination is made that a line break has not been input (NO at Step S31). In that case, the normal display processing, which will be described later, is performed (Step S33). On the other hand, in a case where there are line break data in the work area of the RAM 404, the determination is made that a line break has been input (YES at Step S31). In that case, a determination is made as to whether or not the cursor is positioned at a pictorial symbol character (Step S35). In a case where the current cursor position corresponds to the display position of a pictorial symbol character that is displayed based on the pictorial symbol character data that have been stored in the work area of the RAM 404 (that is, in a case where the cursor 120 is displayed directly below the pictorial symbol character 102 in the display area 100), the determination is made that the cursor is positioned at a pictorial symbol character (YES at Step S35). In that case, the restored display processing, which will be described later, is performed (Step S37).

In a case where the current cursor position does not correspond to the display position of a pictorial symbol character (that is, in a case where the cursor 120 is not displayed directly below the pictorial symbol character 102 in the display area 100), the determination is made that the cursor is not positioned at a pictorial symbol character (NO at Step S35). In that case, the normal display processing, which will be described later, is performed (Step S33). After one of Step S33 and Step S37 is performed, the processing returns to the character display processing (refer to FIG. 4).

Figure 6:
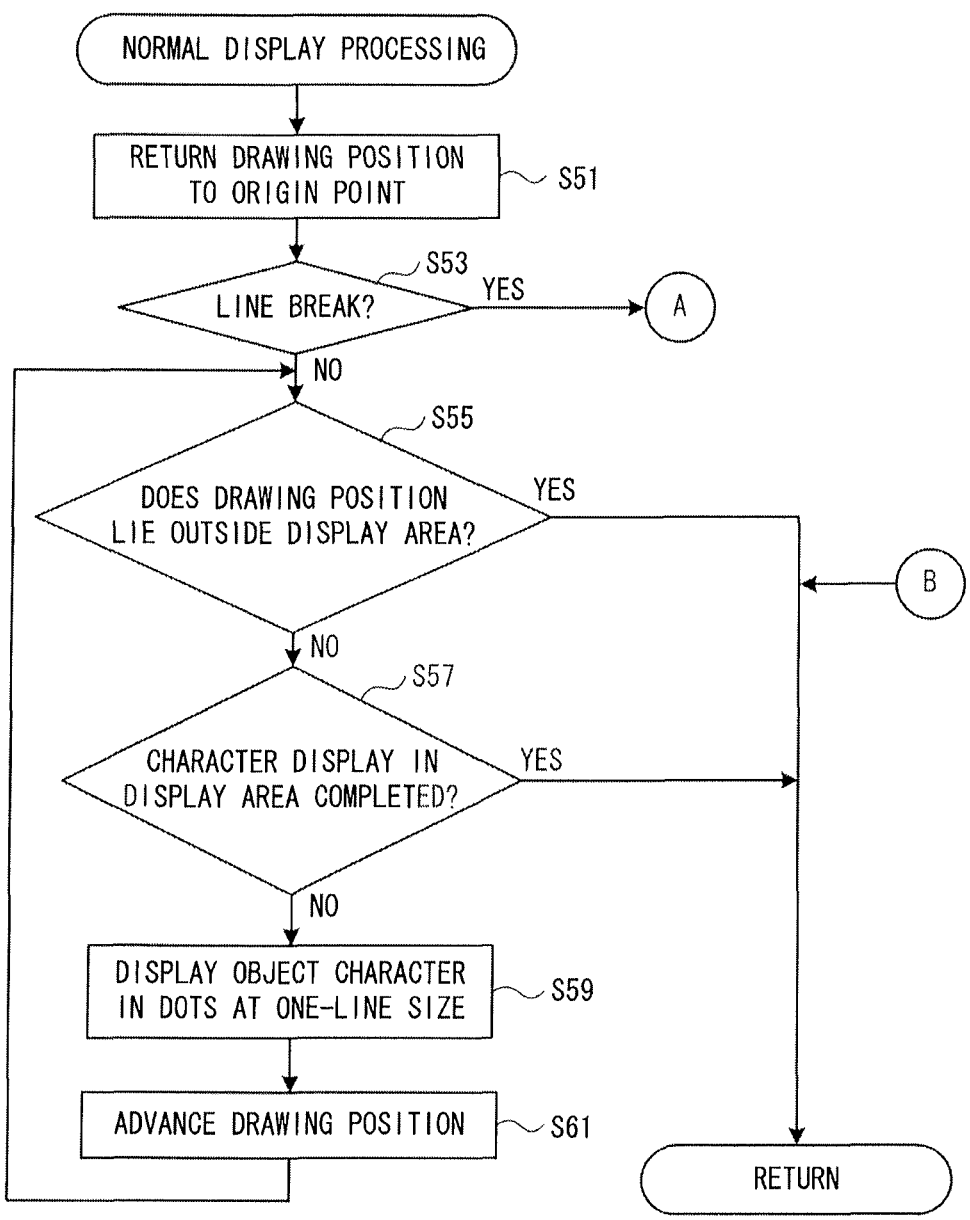
FIG. 6 is a flowchart of normal display processing.
Figure 7:
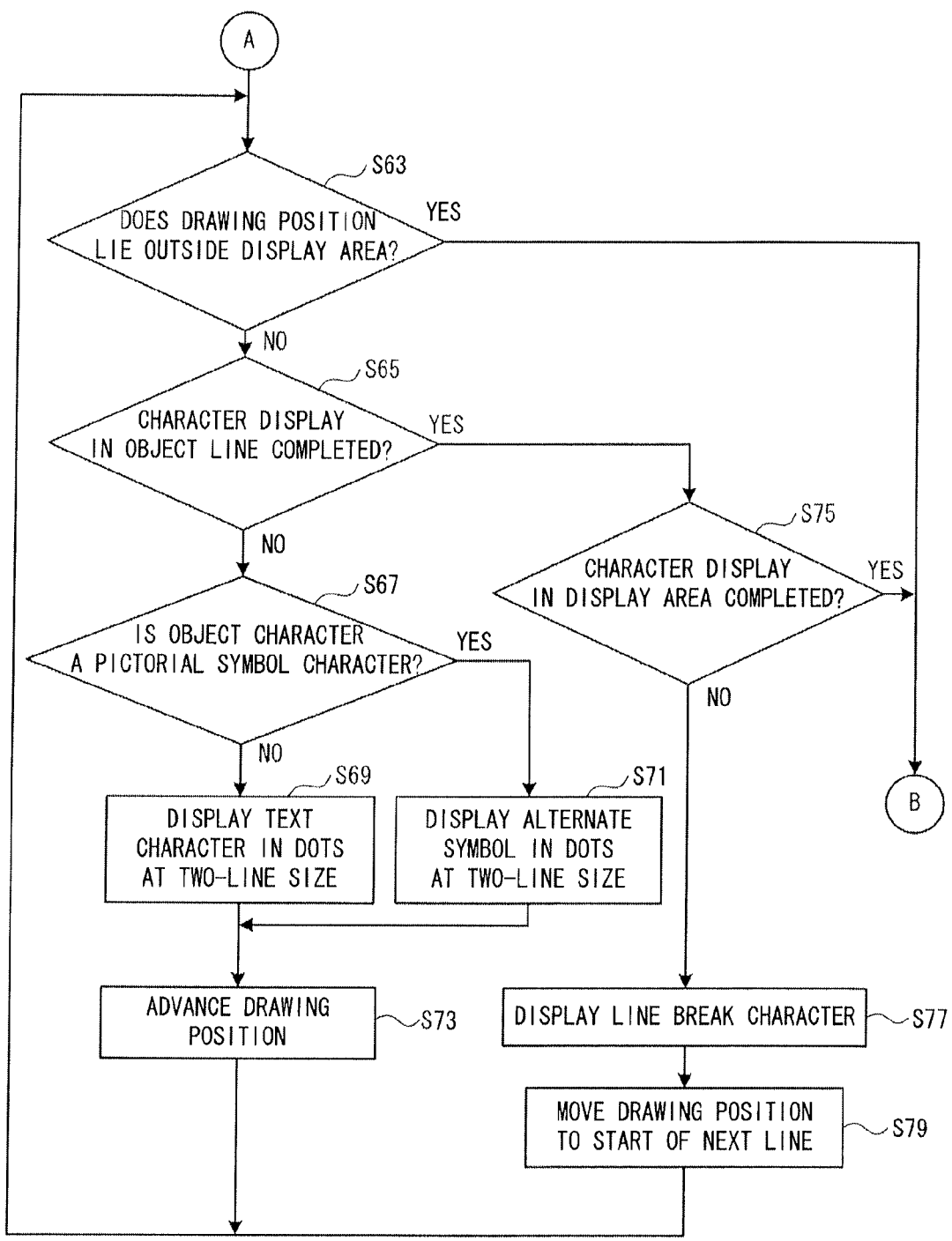
FIG. 7 is a flowchart of the normal display processing, continued from FIG. 6.

In the normal display processing (Step S33), as shown in FIGS. 6 and 7, first, a drawing position is returned to an origin point of the display area 100 (in FIG. 9, the upper left corner of the display area 100) (Step S51). The drawing position is a position where one character that is an object of drawing in the display area 100 (hereinafter called the object character) will be drawn. Immediately after the normal display processing (Step S33) starts, the first character in a character string that the user has input or edited is taken as the object character.

Next, a determination is made as to whether or not a line break has been input (Step S53). In a case where a line break has not been input (NO at Step S53), the character string that the user has input or edited is displayed in one line by the processing that is hereinafter described. First, a determination is made as to whether or not the drawing position lies outside the display area 100 (Step S55). In a case where the drawing position does not lie outside the display area 100 (NO at Step S55), open space is available for displaying the object character in the display area 100. In that case, a determination is made as to whether or not the character display in the display area 100 has been completed (Step S57). Specifically, in a case where all of the characters that make up the character string (that is, all of the character data in the work area) have been displayed, the determination is made that the character display in the display area 100 has been completed (YES at Step S57).

In a case where the character display in the display area 100 has not been completed (NO at Step S57), the object character is drawn in the drawing position using a dot pattern of the one-line size. The object character is thus displayed in the display area 100 in the form of dots of the one-line size (Step S59). Then the drawing position is advanced along the display line (that is, in the direction of the row) by the width of one character (Step S61). The next character in the character string thus is taken as the object character, and the processing returns to Step S55.

In a case where a line break has been input (YES at Step S53), the character string that the user has input or edited is displayed in two lines by the processing that is hereinafter described. First, a determination is made as to whether or not the drawing position lies outside the display area 100 (Step S63). In a case where the drawing position does not lie outside the display area 100 (NO at Step S63), a determination is made as to whether or not the character display in an object line has been completed (Step S65). Of the two display lines that will be formed in the display area 100, the object line is the display line in which the object character will be drawn. Immediately after the normal display processing (Step S3) starts, the object line is set to the first line. At Step S65, in a case where all of the characters that are to be disposed in the object line in the display area 100 have been displayed, the determination is made that the character display in the object line has been completed (YES at Step S65).

In a case where the character display in the object line has not been completed (NO at Step S65), a determination is made as to whether or not the object character is a pictorial symbol character (Step S67). In a case where the object character is a text character, the determination is made that the object character is not a pictorial symbol character (NO at Step S67), and the text character is drawn in the drawing position using a dot pattern of the two-line size. Thus, in the display area 100, the text character 101 (refer to FIG. 9) that is the object character is displayed in the object line in the form of dots of the two-line size (Step S69).

In a case where the object character is a pictorial symbol character (YES at Step S67), an alternate symbol character is drawn in the drawing position using a dot pattern of the two-line size. Thus, in the display area 100, an alternate symbol character 103 (refer to FIG. 9), instead of the pictorial symbol character that is the object character, is displayed in the object line in the form of dots of the two-line size (Step S71). After one of Steps S69 and Step S71 is performed, the drawing position is advanced along the object line (that is, in the direction of the row) by the width of one character (Step S73).

In a case where the character display in the object line has been completed (YES at Step S65), a determination is made as to whether or not the character display in the display area 100 has been completed (Step S75). In a case where the character display in the display area 100 has not been completed (NO at Step S75), a line break character is drawn in the drawing position using a dot pattern of the two-line size. Thus, in the display area 100, a line break character 130 (refer to FIG. 9) is displayed in the object line in the form of dots of the two-line size (Step S77). Then the drawing position is moved to the start of the next line (that is, the second line), which is taken as the object line (Step S79). After one of Steps S73 and Step S79 is performed, the processing returns to Step S63.

In a case where the drawing position lies outside the display area 100 (YES at Step S55 or YES at Step S63), open space for displaying the object character is not available in the display area 100, so the object character is not displayed, and the processing returns to the character display processing (FIG. 5). The processing also returns to the character display processing (FIG. 5) in a case where the character display in the display area 100 has been completed (YES at Step S57 or YES at Step S75).

Figure 8:
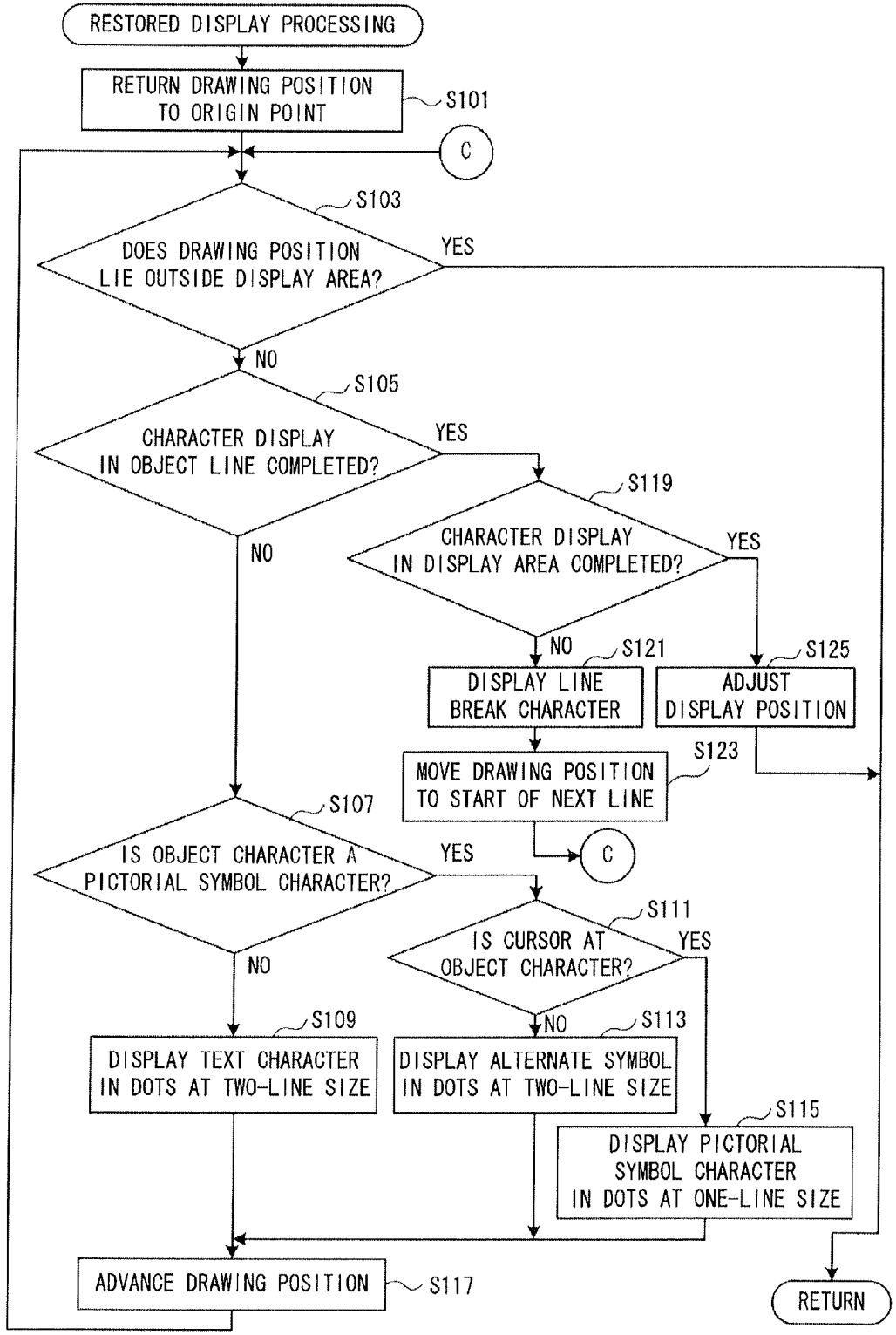
FIG. 8 is a flowchart of restored display processing according to a first embodiment.

In the restored display processing (Step S37) in the first embodiment, as shown in FIG. 8, first, the drawing position is returned to the origin point of the display area 100 (Step S101). Next, a determination is made as to whether or not the drawing position lies outside the display area 100 (Step S103). In a case where the drawing position does not lie outside the display area 100 (NO at Step S103), a determination is made as to whether or not the character display in the object line has been completed (Step S105). In a case where the character display in the object line has not been completed (NO at Step S105), a determination is made as to whether or not the object character is a pictorial symbol character (Step S107). In a case where the object character is a text character (NO at Step S107), the text character that is the object character is displayed in the object line in the form of dots of the two-line size (Step S109).

In a case where the object character is a pictorial symbol character (YES at Step S107), a determination is made as to whether or not the cursor is positioned at the object character (Step S111). In a case where the cursor is not positioned at the object character (NO at Step S111), the alternate symbol character is displayed in the object line in the form of dots of the two-line size (Step S113). In a case where the cursor is positioned at the object character (YES at Step S111), the pictorial symbol character that is the object character is drawn in the drawing position using a dot pattern of the one-line size. Thus, in the display area 100, the pictorial symbol character 102 that is the object character (refer to FIG. 9) is displayed in the object line in the form of dots of the one-line size (Step S115). After one of Steps S109, S113, and S115 is performed, the drawing position is advanced along the object line by the width of one character (Step S117), and the processing returns to Step S103.

In a case where the character display in the object line has been completed (YES at Step S105), a determination is made as to whether or not the character display in the display area 100 has been completed (Step S119). In a case where the character display in the display area 100 has not been completed (NO at Step S119), a line break character is drawn in the object line in the form of dots of the two-line size (Step S121). Then the drawing position is moved to the start of the next line (Step S123), and the processing returns to Step S103.

In a case where the character display in the display area 100 has been completed (YES at Step S119), the display position of the character string that has been drawn in the display area 100 is adjusted (Step S125). For example, the pictorial symbol character that is displayed at the one-line size at Step S115 has a large display size, so it might overlap a character that is disposed in another display line. In that case, the display position of the character that is disposed in the other display line is changed along the display line (that is, in the direction of the row), such that the character does not overlap with the pictorial symbol character of the one-line size. In a case where the drawing position lies outside the display area 100 (YES at Step S103), the object character is not displayed, and the processing returns to the character display processing (FIG. 5).

Figure 9:
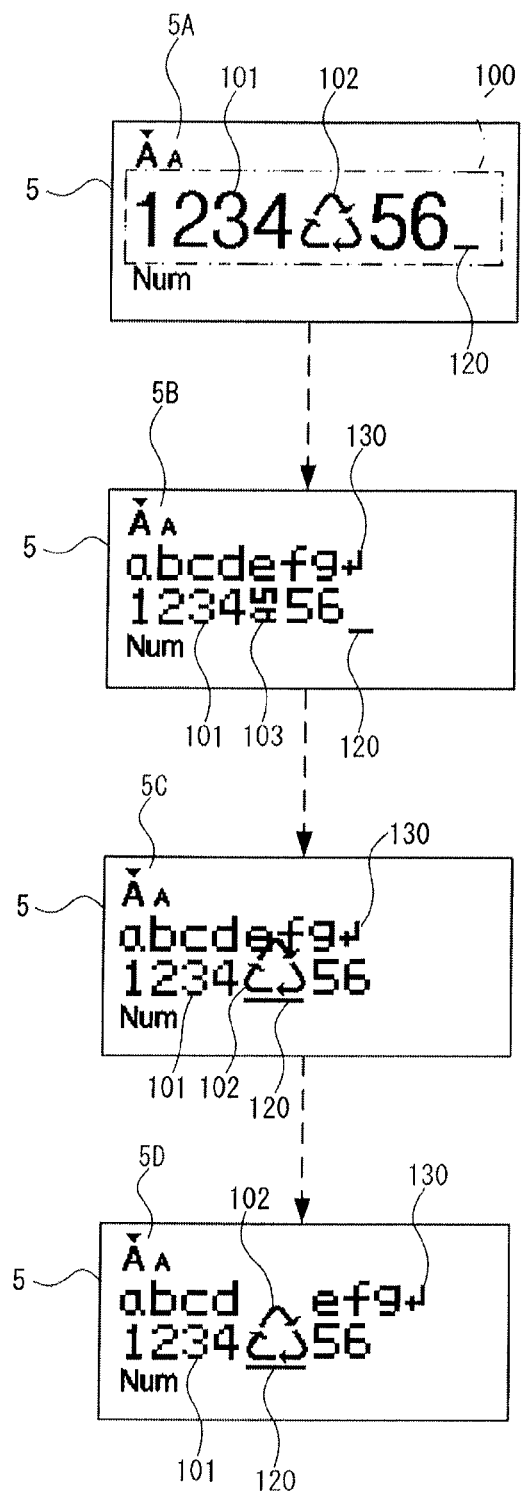
FIG. 9 is examples of screens that are displayed on a display 5 in the first embodiment.

An example of a display on the display 5 in the first embodiment will be explained with reference to FIG. 9. Assume, for example, that the user has used the operation portion 2 to input the character string "1234[pictorial symbol (recycle symbol)]56". In this case, a line break character has not been input (NO at Step S31), so the character string is displayed in one line by the normal display processing (refer to FIGS. 6, 7) (NO at Step S53; Steps S55 to S61). The result, as shown on a screen 5A, is that the character string, which includes the text characters 101 "1" to "6" and the pictorial symbol character 102 "[pictorial symbol (recycle symbol)]", is displayed in the display area 100 at the one-line size. The current cursor position is at the end of the display line, so the cursor 120 is displayed.

Assume, for example, that the user has used the operation portion 2 to input the character string "abcdefg", input a line break character, and input the character string "1234[pictorial symbol (recycle symbol]56". In this case, a line break character has been input (YES at Step S31), and the cursor is not positioned at a pictorial symbol character (NO at Step S35), so the character string is displayed in two lines by the normal display processing (refer to FIGS. 6, 7) (YES at Step S53; Steps S63 to S79).

More specifically, the character string of the text characters 101 "a" to "g" is drawn in the first line at the two-line size (YES at Step S67; Step S69), as shown on a screen 5B. When the drawing of the first line is completed (YES at Step S65), the line break character 130 is drawn (Steps S77, S79). Then the drawing of the character string that is made up of the text characters 101 "1" to "6" and the pictorial symbol character 102 "[pictorial symbol (recycle symbol)]" is started. At this time, the text characters 101 "1" to "6" are drawn at the two-line size (NO at Step S67; Step S69), and instead of the pictorial symbol character 102 "[pictorial symbol (recycle symbol)]", the alternate symbol character 103 "A5" (written vertically) is drawn at the two-line size (NO at Step S67; Step S71). The end of the second line is the current cursor position, so the cursor 120 is displayed.

Ordinarily, a pictorial symbol character that cannot be used in a standard text has a more complex dot pattern than does a text character that can be used in a standard text. In the present embodiment, the dot patterns at the one-line size have a display size (a number of dots) that can adequately express both the text character 101 and the pictorial symbol character 102. In contrast, the dot patterns at the two-line size have a display size (a number of dots) that can adequately express the text character 101, but have a display size (a number of dots) that cannot adequately express the pictorial symbol character 102.

Therefore, the user can visually comprehend content that is displayed in the text character 101, whether the content is displayed at the one-line size or the two-line size. In the case of the pictorial symbol character 102, it may be easy for the user to visually comprehend content that is displayed at the one-line size, but it may be difficult for the user to visually comprehend content that is displayed at the two-line size. In the present embodiment, in a case where the character string is displayed in two lines, the alternate symbol character 103 is used instead of the pictorial symbol characters 102. The alternate symbol character 103 is a simple symbol that can be adequately expressed using dot patterns of the two-line size (for example, the "A5" that is shown on the screen 5B). In a state in which the character string is displayed in two lines, the user can visually recognize the presence and the position of the pictorial symbol character 102 based on the alternate symbol character 103.

Furthermore, assume that in the state that is shown on the screen 5B, the user uses the operation portion 2 to move the cursor 120 to the display position of the alternate symbol character 103. In this case, a line break character has been input (YES at Step S31), and the cursor is at a pictorial symbol character (YES at Step S35), so the character string is displayed in two lines by the restored display processing (refer to FIG. 8).

More specifically, the character string of the text characters 101 "a" to "g" is drawn in the first line at the two-line size (NO at Step S107; Step S109), as shown on a screen 5C. When the drawing of the first line is completed (YES at Step S105), the line break character 130 is drawn (Steps S121, S123). Then the character string that is made up of the text characters 101 "1" to "6" and the pictorial symbol character 102 "[pictorial symbol (recycle symbol)]" is drawn in the second line. At this time, the text characters 101 "1" to "6" are drawn at the two-line size (NO at Step S107; Step S109). The pictorial symbol character 102 "[pictorial symbol (recycle symbol)]" is drawn at the one-line size (YES at Step S107; YES at Step S111; Step S115). The pictorial symbol character 102 "[pictorial symbol (recycle symbol)]" is the current cursor position, so the cursor 120 is displayed.

On the screen 5C, the alternate symbol character 103 that the user selected with the cursor 120 is restored to the pictorial symbol character 102, and because the display of the pictorial symbol character 102 is enlarged from the two-line size to the one-line size, the user can visually recognize the displayed content of the pictorial symbol character 102. Finally, the display position of the character string that is displayed in the display area 100 is adjusted (Step S125). Thus, as shown on a screen 5D, the display positions on the first line of the text characters 101 "e" to "g" and the line break character 130 are changed such that they do not overlap with the pictorial symbol character 102 "[pictorial symbol (recycle symbol)]" that is at the one-line size. Therefore, the visual comprehensibility of the pictorial symbol character 102 that has been restored from the alternate symbol character 103 and enlarged can be enhanced even further. Note that Step 5125 may not necessarily be performed. In that case, the screen 5C is displayed on the display 5.

As explained above, in the first embodiment, characters that have been input or edited from the operation portion 2 are disposed in at least one display line and displayed. At this time, the characters are displayed in the form of dot patterns of a display size (one of the one-line size and the two-line size) that is determined in advance in accordance with the number of the display lines. In a case where the number of the display lines is two lines, the dot pattern for the alternate symbol character 103 is displayed instead of the dot pattern for the pictorial symbol character 102. When the alternate symbol character 103 that is being displayed is designated, the dot pattern for the pictorial symbol character 102 is displayed, at the one-line size, instead of the dot pattern for the alternate symbol character 103.

Thus, in a case where the number of the display lines that are displayed in the display area 100 is high, the alternate symbol character 103, which has a small display size, is displayed instead of the pictorial symbol character 102. On the other hand, when the user designates the alternate symbol character 103, the original pictorial symbol character 102 is displayed at a large display size (the one-line size). Therefore, the user can cause the pictorial symbol character 102 to be displayed in the display area 100 at the large display size only when the user wants to know the displayed content of the pictorial symbol character 102. This can improve the visual comprehensibility of the pictorial symbol character 102 that the user has designated, while limiting the impairment of the visual comprehensibility of the display area 100 as a whole. Furthermore, because the character string that is the object of printing can be input and edited easily, the convenience for the user is high.

In a case where the character that the user has designated is the alternate symbol character 103, the dot pattern for the pictorial symbol character 102 is displayed at the one-line size, which is a size at which the dot pattern can at least be recognized as the pictorial symbol character 102, so the user is reliably able to recognize the display content of the pictorial symbol character 102. Because the cursor key (not shown in the drawings) is provided for moving the cursor 120 along the display line, the cursor 120 indicating the position where the input or the editing of the character will be performed, the user can easily designate the alternate symbol character 103 with the cursor 120.

In the restored display processing (Step S37), in a case where the alternate symbol character 103 is changed to the pictorial symbol character 102, the dot patterns for the other characters that are included in the display line in which the designated alternate symbol character 103 is disposed are displayed in positions that are set apart from the dot pattern for the pictorial symbol character 102. Furthermore, the other characters that are included in the display line in which the designated alternate symbol character 103 is not disposed are displayed in positions that are set apart from the dot pattern for the pictorial symbol character 102. Thus, even in a case where the pictorial symbol character 102 has been restored from the alternate symbol character 103 and displayed, the dot pattern for the pictorial symbol character 102 does not overlap the dot patterns for the other characters, so the visual comprehensibility of the pictorial symbol character 102 can be enhanced even further.

A second embodiment of the present disclosure will be explained with reference to FIGS. 10 to 15. The configuration of the printer 1 is the same as in the first embodiment, so an explanation will be omitted. In the second embodiment, the details of the restored display processing (Step S37) are different from the first embodiment. Hereinafter, explanations of processing that is the same as in the first embodiment will be omitted, and the processing that is different will be explained.

Figure 10:
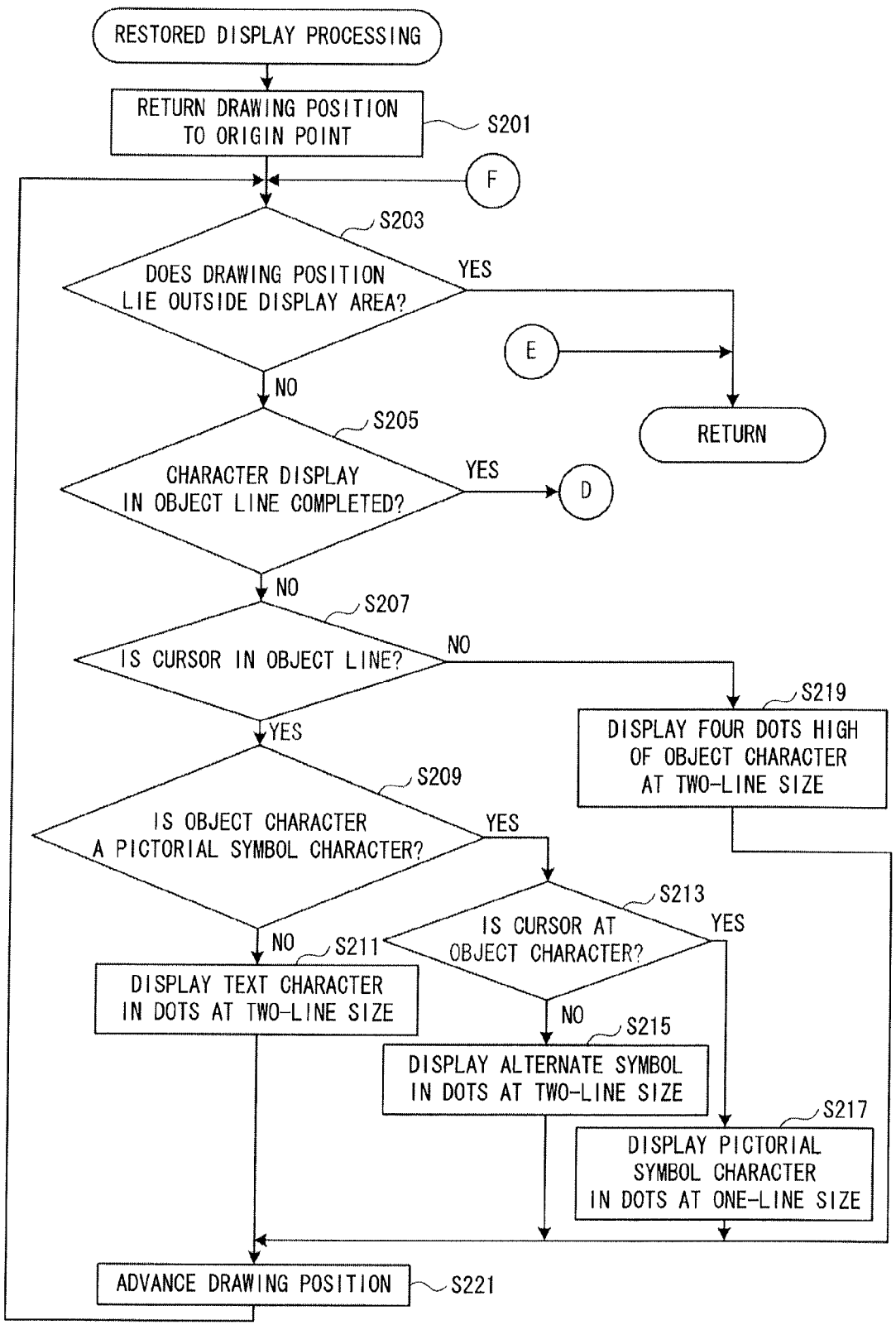
FIG. 10 is a flowchart of the restored display processing according to a second embodiment.
Figure 11:
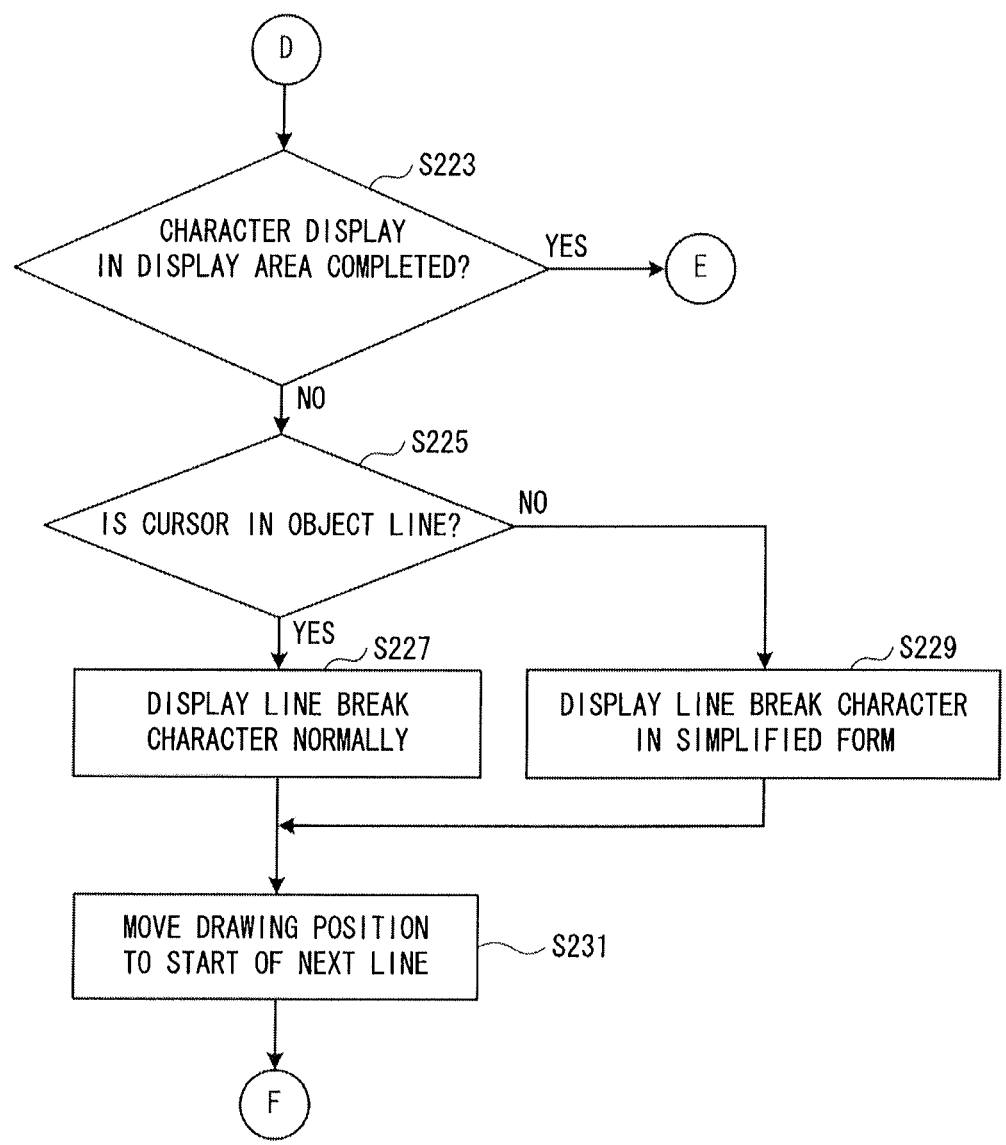
FIG. 11 is a flowchart of the restored display processing according to the second embodiment, continued from FIG. 10.

As shown in FIGS. 10 and 11, in the restored display processing (Step S37) in the second embodiment, first, the drawing position is returned to the origin point of the display area 100 (Step S201). Next, a determination is made as to whether or not the drawing position lies outside the display area 100 (Step S203). In a case where the drawing position does not lie outside the display area 100 (NO at Step S203), a determination is made as to whether or not the character display in the object line has been completed (Step S205). In a case where the character display in the object line has not been completed (NO at Step S205), a determination is made as to whether or not the cursor is positioned in the object line (Step S207).

In a case where the cursor is positioned in the object line (YES at Step S207), the processing is the same as in the previously described Steps S107 to S117. That is, a determination is made as to whether or not the object character is a pictorial symbol character (Step S209). In a case where the object character is a text character (NO at Step S209), the text character that is the object character is displayed in the object line in the form of dots of the two-line size (Step S211). In a case where the object character is a pictorial symbol character (YES at Step S209), a determination is made as to whether or not the cursor is positioned at the object character (Step S213). In a case where the cursor is not positioned at the object character (NO at Step S213), the alternate symbol character is displayed in the object line in the form of dots of the two-line size (Step S215). In a case where the cursor is positioned at the object character (YES at Step S213), the pictorial symbol character that is the object character is displayed in the object line in the form of dots of the one-line size (Step S217).

In a case where the cursor is not positioned in the object line (NO at Step S207), a portion of the object character that is four dots high is displayed at the two-line size (Step S219). Specifically, out of all the dot data for drawing the object character at the two-line size, the data are selected that describe a portion that is four dots high at either the top or the bottom of the object character, and that portion of the object character is drawn. After one of Steps S211, S215, S217, and Step S219 is performed, the drawing position is advanced along the object line by the width of one character (Step S221), and the processing returns to Step S203.

In a case where the character display in the object line has been completed (YES at Step S205), a determination is made as to whether or not the character display in the display area 100 has been completed (Step S223). In a case where the character display in the display area 100 has not been completed (NO at Step S223), a determination is made as to whether or not the cursor is positioned in the object line (Step S225). In a case where the cursor is positioned in the object line (YES at Step S225), the line break character is displayed normally (Step S227). Specifically, the line break character is displayed in the object line in the form of dots of the two-line size, in the same manner as at the previously described Step S121.

In a case where the cursor is not positioned in the object line (NO at Step S225), the line break character is displayed in simplified form (Step S229). Specifically, out of all the dot data for drawing the line break character at the two-line size, data are selected for drawing a portion that is four dots high at either the top or the bottom of the line break character, and that portion is drawn. After one of Steps S227 and S229 is performed, the drawing position is moved to the start of the next line (Step S231), and the processing returns to Step S203. In a case where the drawing position does lie outside the display area 100 (YES at Step S203), and in a case where the character display in the display area 100 has been completed (YES at Step S223), the processing returns to the character display processing (FIG. 5).

Figure 12:
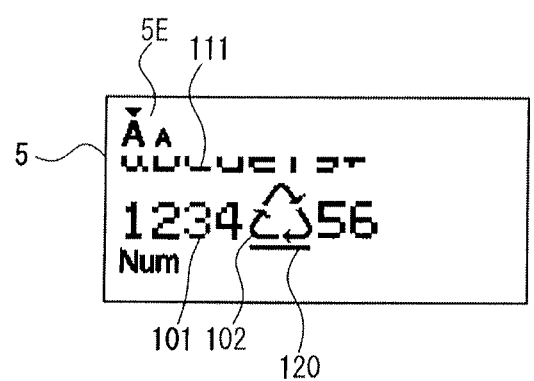
FIG. 12 is a screen that is displayed on the display 5 in the second embodiment.

An example of the display on the display 5 in the second embodiment will be explained with reference to FIG. 12. Assume, for example, that in the state that is shown on the screen 5B (refer to FIG. 9), the user has used the operation portion 2 to move the cursor 120 to the display position of the alternate symbol character 103. In this case, a line break character has been input (YES at Step S31), and the cursor is positioned at a pictorial symbol character (YES at Step S35), so the character string is displayed in two lines by the restored display processing (refer to FIGS. 10 and 11).

More specifically, as shown on a screen 5E, out of all the dot data for drawing the character string of the text characters 101 "a" to "g" at the two-line size, the data are selected that describe a portion that is four dots high at the bottom of the character string, and that portion of the character string is drawn at the two-line size in the first line (NO at Step S207; Step S219). When the drawing of the first line has been completed (YES at Step S205), out of all the dot data for drawing the line break character 130 at the two-line size, the data are selected that describe a portion that is four dots high at the bottom of the line break character 130, and that portion of the line break character 130 is drawn (NO at Step S225; Step S229). In other words, in the first line, partial characters 111 are displayed that display only the portions that are four dots high at the bottoms of the text characters 101 "a" to "g" and the line break character 130 of the two-line size.

Then the drawing of the character string that is made up of the text characters 101 "1" to "6" and the pictorial symbol character 102 "[pictorial symbol (recycle symbol)]" is started. At this time, the text characters 101 "1" to "6" are drawn at the two-line size (NO at Step S209; Step S211), and the pictorial symbol character 102 "[pictorial symbol (recycle symbol)]" is drawn at the one-line size (YES at Step S209; YES at Step S213; Step S217). The pictorial symbol character 102 "[pictorial symbol (recycle symbol)]" is the current cursor position, so the cursor 120 is displayed.

On the screen 5E, the alternate symbol character 103 that the user selected with the cursor 120 is restored to the pictorial symbol character 102, and because the display of the pictorial symbol character 102 is enlarged from the two-line size to the one-line size, the user can visually recognize the displayed content of the pictorial symbol character 102. Furthermore, in the character string that is disposed in the display line in which the cursor 120 is not positioned (on the screen 5E, the first line), only a portion of each of the characters is displayed. Thus, because the visual comprehensibility of the display line to which the user is not paying attention (the unnoticed line) is diminished, the visual comprehensibility of the display line to which the user is paying attention (the noticed line) can be enhanced. Therefore, the visual comprehensibility of the pictorial symbol character 102 that has been restored from the alternate symbol character 103 and enlarged can be enhanced even further.

Figure 13:
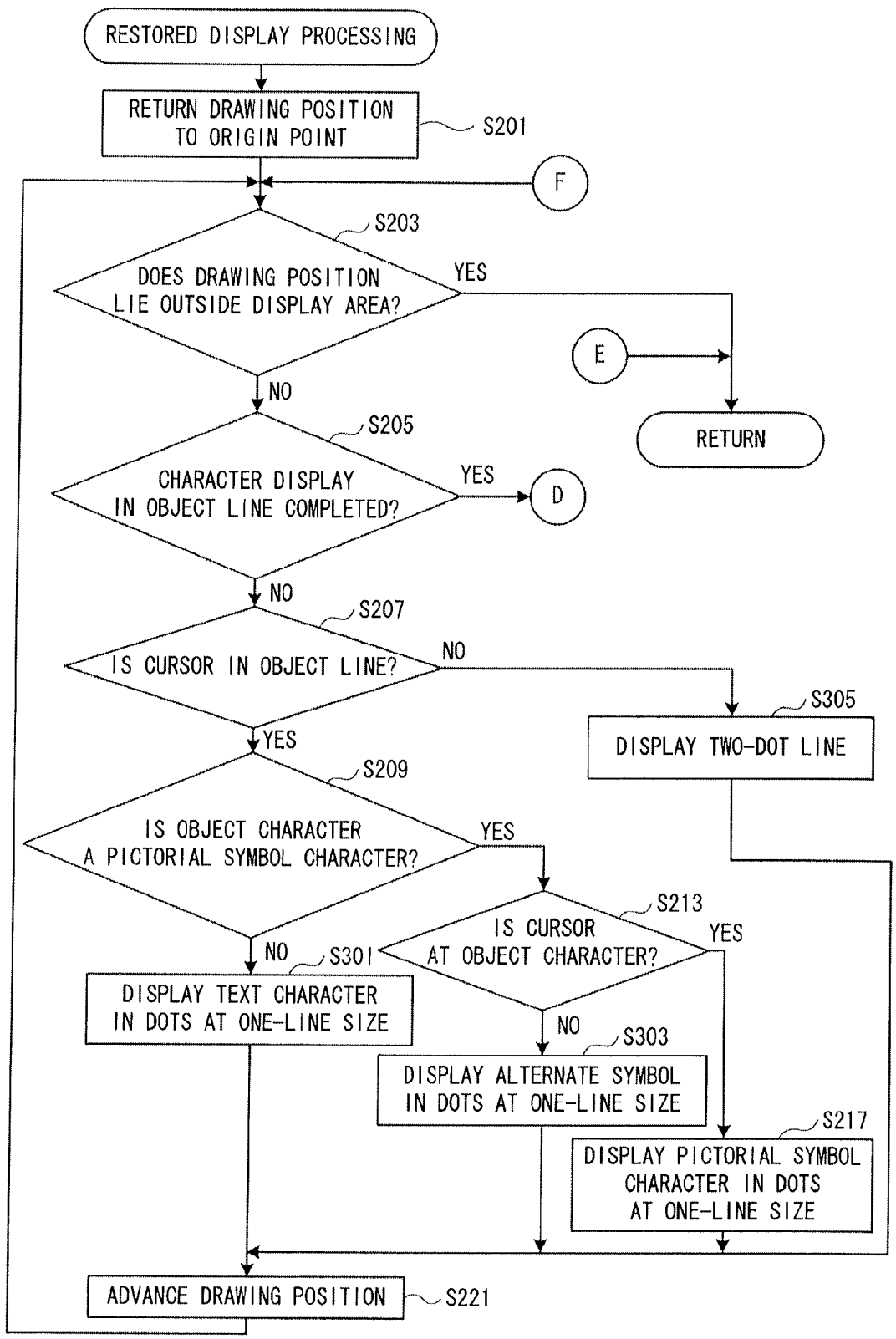
FIG. 13 is another flowchart of the restored display processing according to the second embodiment.

The modifications described below can be made to the restored display processing (Step S37) according to the second embodiment. In the restored display processing that is shown in FIG. 13, for example, instead of Step S211, the text character that is the object character may be displayed in the object line in the form of dots of the one-line size (Step S301). Instead of Step S215, the alternate symbol character that is the object character may be displayed in the object line in the form of dots of the one-line size (Step S303). Instead of Step S219, a horizontal line that is two dots high may be displayed instead of the object character (Step S305).

Figure 14:
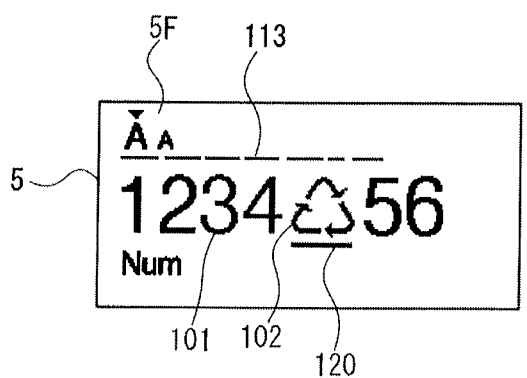
FIG. 14 is an example of another screen that is displayed on the display 5 in the second embodiment.

In that case, when the user moves the cursor 120 to the display position of the alternate symbol character 103, a screen 5F is displayed on the display 5, as shown in FIG. 14. On the screen 5F, on the display line in which the cursor 120 is positioned (on the screen 5F, the second line), the entire character string is displayed at the one-line size, so the entire noticed line can be displayed in the enlarged form, enhancing its visual comprehensibility. The character string that is disposed on the display line in which the cursor 120 is not positioned (on the screen 5F, the first line) is displayed in the alternate form of two-dot lines 113. The two-dot lines 113 that are displayed in the unnoticed line make it possible for the user to determine the number of characters that are located in the unnoticed line. Displaying the character string in the alternate form of the simple symbols of the two-dot lines 113 enhances the visual comprehensibility of the noticed line. Therefore, the visual comprehensibility of the pictorial symbol character 102 that has been restored from the alternate symbol character 103 and enlarged can be enhanced even further.

Figure 15:
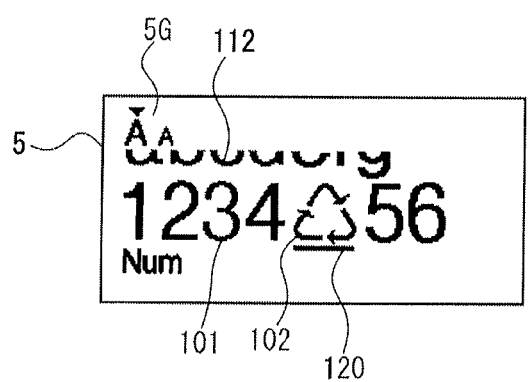
FIG. 15 is an example of another screen that is displayed on the display 5 in the second embodiment.

In the restored display processing (Step S37) according to the second embodiment, at Steps S211, S215, the text characters and the alternate symbol character may be displayed in the form of dots of the one-line size, and at Step S219, out of all the dot data for drawing the object character at the one-line size, the data may be selected that describe a portion that is four dots high at the bottom of the object character, and that portion of the object character may be displayed. In this case, when the user moves the cursor 120 to the display position of the alternate symbol character 103, a screen 5G is displayed on the display 5, as shown in FIG. 15.

On the screen 5G, all of the characters that are displayed in the display area 100 are displayed at the one-line size, so all of the characters can be displayed in the enlarged form, enhancing their visual comprehensibility. Furthermore, in the first line, partial characters 112 are displayed that display only the portions that are four dots high at the bottoms of the text characters 101 "a" to "g" and the line break character 130 of the one-line size. In other words, in the character string that is disposed in the display line in which the cursor 120 is not positioned (on the screen 5G, the first line), only a portion of each of the characters is displayed. Therefore, the visual comprehensibility of the noticed line can be enhanced, and in turn, the visual comprehensibility of the pictorial symbol character 102 that has been restored from the alternate symbol character 103 and enlarged can be enhanced even further.

As explained above, in the second embodiment, in the same manner as in the first embodiment, the visual comprehensibility of the pictorial symbol character 102 that the user has designated can be improved, while the impairment of the visual comprehensibility of the display area 100 as a whole is limited. Because the character string that is the object of printing can be input and edited easily, the convenience for the user is high. Furthermore, in the restored display processing (Step S37), in a case where the alternate symbol character 103 is changed to the pictorial symbol character 102, the dot patterns for the other characters that are included in the display line in which the designated alternate symbol character 103 is not disposed are changed to the dot patterns for simplified characters that are determined in advance (partial characters four dots high, horizontal lines two dots high). The visual comprehensibility of the pictorial symbol character 102 that has been restored from the alternate symbol character 103 and enlarged can thus be enhanced even further.

The present disclosure is not limited to the embodiments that have been described above, and various types of modifications can be made. For example, in the embodiments that are described above, in a case where the number of display lines is two, although an alternate character (the alternate symbol character 103) is displayed instead of a special character (the pictorial symbol character 102), the original special character is displayed when the user designates the alternate symbol character 103. The special character is not limited to the pictorial symbol character 102, and another character can be used (for example, a kanji character with a large number of strokes, a complex symbol, or the like). The alternate character is not limited to the alternate symbol character 103, and another character can be used (for example, a simple symbol, graphic, or the like, such as a circle, an X, or the like).

The number of the display lines that are formed in the display area 100, the number of the display lines in which the display can be changed between the special character and the alternate character, and the like, can be modified as desired. For example, in a case where the number of the display lines in the display area 100, in which at least three display lines can be formed, reaches a threshold value (for example, two lines), while the alternate character is displayed instead of the special character, the original special character may be displayed if the user designates the alternate character.

Figure 16:
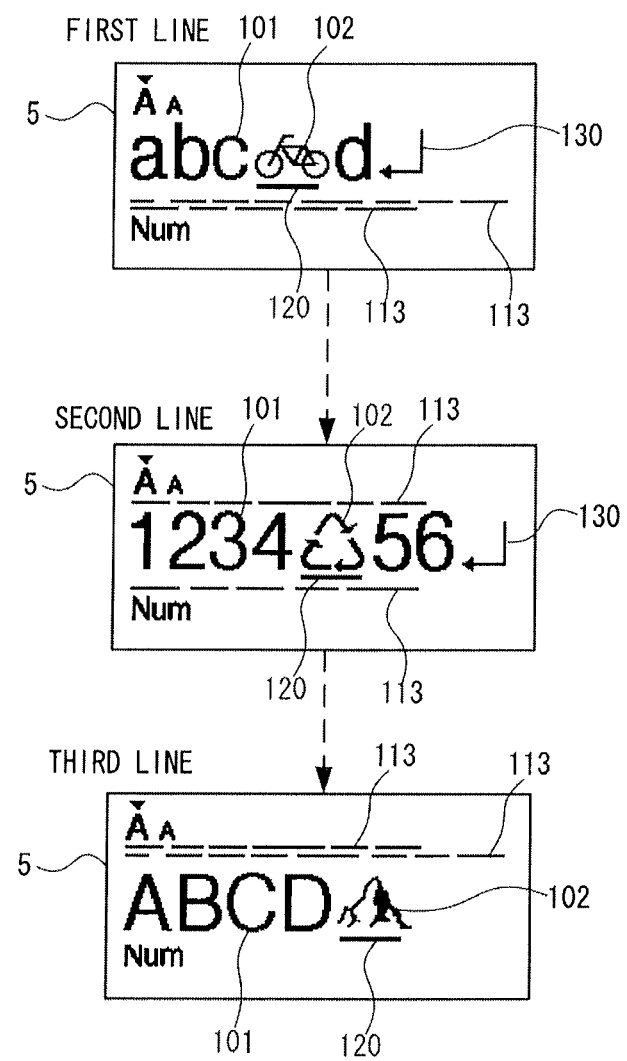
FIG. 16 is examples of screens that are displayed on the display 5 in a modified example.

Specifically, in the same manner as in the restored display processing (Step S37) according to the second embodiment, if the character string is displayed on three lines in the display area 100, screens like those shown in FIG. 16 are displayed on the display 5. When the user moves the cursor 120 to the alternate symbol character 103 (not shown in the drawing) in the first line, the entire character string for the first line is displayed at the one-line size, and the character strings for the second and third lines are displayed entirely in the form of the two-dot lines 113.

In the same manner, when the user moves the cursor 120 to the alternate symbol character 103 (not shown in the drawing) in the second line, the entire character string for the second line is displayed at the one-line size, and the character strings for the first and third lines are displayed entirely in the form of the two-dot lines 113. When the user moves the cursor 120 to the alternate symbol character 103 (not shown in the drawing) in the third line, the entire character string for the third line is displayed at the one-line size, and the character strings for the first and second lines are displayed entirely in the form of the two-dot lines 113. Thus, even in a case where the screen size on the display 5 is small, a plurality of the display lines can be formed in the display area 100, and characters can be input and edited.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A display device, comprising:
    an operation portion for inputting and editing at least one character;
    a display portion that is capable of displaying, in a form of a dot pattern, the at least one character that has been at least one of input and edited from the operation portion, the at least one character being disposed in at least one display line, each of the at least one display line being configured as one of a vertical line and a horizontal line;
    a character designating portion for designating, as a designated character, one of the at least one character displayed on the display portion; and
    a display control portion that
        displays the at least one character on the display portion using a dot pattern with a display size, the display size being determined in advance in accordance with a number of the at least one display line,
        displays, in a case where the at least one character displayed on the display portion includes a predetermined special character and the number of the at least one display lines is not less than a threshold value, a dot pattern for an alternate character instead of a dot pattern for the special character, the alternate character being different from the special character, and
        changes, in a case where the designated character is the alternate character, the dot pattern for the designated character displayed on the display portion to the dot pattern for the special character with a display size that is used in a case where the number of the at least one display line is less than the threshold value.

2. The display device according to claim 1, wherein the display control portion, in a case where the designated character is the alternate character, displays the dot pattern for the special character with a display size at which the dot pattern can be at least recognized as the special character.

3. The display device according to claim 1, wherein the character designating portion is a cursor key for moving, along the display line, a cursor that indicates a position where one of the inputting and the editing of the at least one character is performed.

4. The display device according to claim 1, wherein the display control portion, in a case where the dot pattern for the designated character is changed to the dot pattern for the special character, displays the dot pattern for any other of the at least one character included in the same display line as the designated character in a position set apart from the dot pattern for the special character.

5. The display device according to claim 4, wherein the display control portion, in a case where the dot pattern for the designated character is changed to the dot pattern for the special character, displays the dot pattern for any other of the at least one character included in a different display line from the designated character in a position set apart from the dot pattern for the special character.

6. The display device according to claim 5, wherein the display control portion, in a case where the dot pattern for the designated character is changed to the dot pattern for the special character, changes the dot pattern for any other of the at least one character included in the different display line from the designated character to a dot pattern for a predetermined simple character.

7. The display device according to claim 1, further comprising:
    a printing portion that prints the at least one character displayed on the display portion.

8. A display device, comprising:
    an operation portion configured to input and edit at least one character;
    a display portion configured to display, in a form of a dot pattern, the at least one character that has been at least one of input and edited from the operation portion, the at least one character being disposed in at least one display line, each of the at least one display line being configured as one of a vertical line and a horizontal line;
    a character designating portion configured to designate, as a designated character, one of the at least one character displayed on the display portion; and
    a processor configured to cause the display device to:
        display the at least one character on the display portion using a dot pattern with a display size, the display size being determined in advance in accordance with a number of the at least one display line,
        display, in a case where the at least one character displayed on the display portion includes a predetermined special character and the number of the at least one display lines is not less than a threshold value, a dot pattern for an alternate character instead of a dot pattern for the special character, the alternate character being different from the special character, and
        change, in a case where the designated character is the alternate character, the dot pattern for the designated character displayed on the display portion to the dot pattern for the special character with a display size that is used in a case where the number of the at least one display line is less than the threshold value.

9. The display device according to claim 8, wherein the processor is configured to cause the display device to
display, in a case where the designated character is the alternate character, the dot pattern for the special character with a display size at which the dot pattern can be at least recognized as the special character.

10. The display device according to claim 8, wherein
the character designating portion is a cursor key for moving, along the display line, a cursor that indicates a position where one of the inputting and the editing of the at least one character is performed.

11. The display device according to claim 8, wherein the processor is configured to cause the display device to
display, in a case where the dot pattern for the designated character is changed to the dot pattern for the special character, the dot pattern for any other of the at least one character included in the same display line as the designated character in a position set apart from the dot pattern for the special character.

12. The display device according to claim 11, wherein the processor is configured to cause the display device to
display, in a case where the dot pattern for the designated character is changed to the dot pattern for the special character, the dot pattern for any other of the at least one character included in a different display line from the designated character in a position set apart from the dot pattern for the special character.

13. The display device according to claim 12, wherein the processor is configured to cause the display device to
change, in a case where the dot pattern for the designated character is changed to the dot pattern for the special character, the dot pattern for any other of the at least one character included in the different display line from the designated character to a dot pattern for a predetermined simple character.

14. The display device according to claim 8, further comprising:
a printing portion configured to print the at least one character displayed on the display portion.

15. A non-transitory computer-readable medium that stores a display control program that contains instructions for a computer of a display device that is provided with an operation portion for inputting and editing at least one character, a display portion that is capable of displaying, in a form of a dot pattern, the at least one character that has been at least one of input and edited from the operation portion, the at least one character being disposed in at least one display line, each of the at least one display line being configured as one of a vertical line and a horizontal line, and a character designating portion for designating, as a designated character, one of the at least one character displayed on the display portion, the instructions in the display control program causing the computer to perform the steps of:
displaying the at least one character on the display portion using a dot pattern with a display size, the display size being determined in advance in accordance with a number of the at least one display line,
displaying, in a case where the at least one character displayed on the display portion includes a predetermined special character and the number of the at least one display lines is not less than a threshold value, a dot pattern for an alternate character instead of a dot pattern for the special character, the alternate character being different from the special character, and
changing, in a case where the designated character is the alternate character, the dot pattern for the designated character displayed on the display portion to the dot pattern for the special character with a display size that is used in a case where the number of the at least one display line is less than the threshold value.

16. The computer-readable medium according to claim 15, wherein the instructions causing the computer to perform the step of
displaying, in a case where the designated character is the alternate character, the dot pattern for the special character with a display size at which the dot pattern can be at least recognized as the special character.

17. The computer-readable medium according to claim 15, wherein
the character designating portion is a cursor key for moving, along the display line, a cursor that indicates a position where one of the inputting and the editing of the at least one character is performed.

18. The computer-readable medium according to claim 15, wherein the instructions causing the computer to perform the step of
displaying, in a case where the dot pattern for the designated character is changed to the dot pattern for the special character, the dot pattern for any other of the at least one character included in the same display line as the designated character in a position set apart from the dot pattern for the special character.

19. The computer-readable medium according to claim 18, wherein the instructions causing the computer to perform the step of
displaying, in a case where the dot pattern for the designated character is changed to the dot pattern for the special character, the dot pattern for any other of the at least one character included in a different display line from the designated character in a position set apart from the dot pattern for the special character.

20. The computer-readable medium according to claim 19, wherein the instructions causing the computer to perform the step of
changing, in a case where the dot pattern for the designated character is changed to the dot pattern for the special character, the dot pattern for any other of the at least one character included in the different display line from the designated character to a dot pattern for a predetermined simple character.

* * * * *

UNITED STATES PATENT AND TRADEMARK OFFICE
CERTIFICATE OF CORRECTION

PATENT NO. : 8,913,062 B2
APPLICATION NO. : 13/625067
DATED : December 16, 2014
INVENTOR(S) : Tomoki Miyashita et al.

It is certified that error appears in the above-identified patent and that said Letters Patent is hereby corrected as shown below:

On the title page items (71) and (72),

Correct the Applicant's residence information to read as follows:

-- Applicants: Tomoki Miyashita, Nagoya (JP);
 Hidekazu Ishii, Inazawa (JP);
 Nako Yoshimura, Nagoya (JP) --

Please correct the Inventor's residence information to read as follows:

-- Inventors: Tomoki Miyashita, Nagoya (JP);
 Hidekazu Ishii, Inazawa (JP);
 Nako Yoshimura, Nagoya (JP) --

Signed and Sealed this
Eighth Day of September, 2015

Michelle K. Lee
*Director of the United States Patent and Trademark Office*